United States Patent
McMullan et al.

(10) Patent No.: US 7,028,051 B1
(45) Date of Patent: Apr. 11, 2006

(54) METHOD OF REAL-TIME BUSINESS COLLABORATION

(75) Inventors: Scott R. McMullan, San Diego, CA (US); David M. Meagher, San Diego, CA (US)

(73) Assignee: UGS Corp., Plano, TX (US)

(*) Notice: Subject to any disclaimer, the term of this patent is extended or adjusted under 35 U.S.C. 154(b) by 851 days.

(21) Appl. No.: 09/675,699

(22) Filed: Sep. 29, 2000

(51) Int. Cl.
*G06F 17/30* (2006.01)

(52) U.S. Cl. .................. 707/104.1; 707/1; 707/10; 713/201; 709/223

(58) Field of Classification Search ............... 713/201, 713/186, 156; 709/246, 223, 229, 203, 220, 709/219; 705/67, 26, 14, 7; 707/1, 10, 104.1
See application file for complete search history.

(56) References Cited

U.S. PATENT DOCUMENTS

| | | | |
|---|---|---|---|
| 6,292,840 B1 | 9/2001 | Blomfield-Brown et al. | |
| 6,345,291 B1 | 2/2002 | Murphy, Jr. et al. | |
| 6,412,009 B1* | 6/2002 | Erickson et al. | 709/228 |
| 6,510,448 B1 | 1/2003 | Churchyard | |
| 6,567,848 B1* | 5/2003 | Kusuda et al. | 709/219 |
| 6,643,778 B1 | 11/2003 | Nakazawa | |
| 2002/0010865 A1 | 1/2002 | Fulton et al. | |
| 2002/0108059 A1* | 8/2002 | Canion et al. | 713/201 |
| 2003/0139975 A1* | 7/2003 | Perkowski | 705/26 |

* cited by examiner

*Primary Examiner*—Jeffrey Gaffin
*Assistant Examiner*—Hassan Mahmoudi
(74) *Attorney, Agent, or Firm*—Luce, Forward, Hamilton & Scripps LLP

(57) ABSTRACT

Computer architecture and software for computer network communication such that data is at least partially converted between distinct transport protocols in order to optimize transmission of the data, and preferably to allow persistent connections to be maintained across different firewalls. As a preferred embodiment, the transport protocol conversion may cause the data to be converted between HTTP 1.1 protocol, to allow a persistent connection originated across port 80 of a first firewall, and a different protocol, to allow a persistent connection across a second firewall. The protocol conversion of the present invention is especially useful in connection with collaborative application software, wherein the collaborative server and its associated clients are respectively more amenable to different transport protocols.

15 Claims, 5 Drawing Sheets

METHOD OF REAL-TIME BUSINESS COLLABORATION

The present invention is directed to computer networks, such as the Internet, and more particularly to manipulation of network communication protocols and data format of data communicated over a computer network for the purposes of real-time collaboration.

BACKGROUND OF THE INVENTION

Computer networks have turned out to be an important communication tool for business, pleasure and governmental purposes. For example, employees of a large business may communicate over an intranet of networked computers. There are also computer networks with wider scope. Of course, the Internet is currently the most prevalent computer network these days. The Internet serves as a sort of meta-network to connect a great many individual computers, intranets and other, smaller-scale networks into a vast global network. While the technical specifics of the Internet may change or evolve over time, there will probably continue to be small-scale computer networks, as well as one or more computer networks that are global in scope.

Much data communication over the Internet, and other computer networks, is performed through transmission control protocol ("TCP") virtual circuit connections. In a virtual circuit connection, two computers that are communicating over the computer network send and receive data as though they were connected by a single, static communication path, such as a telephone wire. However, the communication does not, in fact, generally take place over any single dedicated wire or wireless path. Instead there is a complex system of packet switching that sends various portions of a data communication over various paths, depending primarily on what paths are most readily available to transmit the data. Virtual circuit connections are characterized by the reliable, in-order delivery of all data they carry.

In the Internet world of virtual circuit connections, there are generally two types of communications, intermittent and persistent. In intermittent communication, two communicating computers intermittently establish, break and reestablish multiple virtual connections over time. In persistent communication, a single virtual circuit connection is maintained even during lulls when no substantive data is being communicated in either direction.

There are advantages to this intermittent communication. Basically, in the intermittent communication context, the computers at either end of the communication conserve their resources by not maintaining a persistent connection. This can be especially important at the server computer side of things, because a server computer may need to handle many overlapping request from numerous client computers that are connected (all over the world) to the Internet.

However, intermittent communication has some shortcomings. For example, if two or more individuals want to communicate in real-time this can theoretically be done with quick successive intermittent connections. One example of this is called polling, where the a client computer continually and consecutively establishes short-duration connections with a server computer to confirm that there is no new data at the server end which the client may wish to access.

However, the numerous, successive intermittent communications are required to ensure that any new data added at the server end is quickly requested and received at the client end (to facilitate real-time collaboration) can cause a large drain on the computer system resources of the individual client computer systems, as well as on network resources (e.g., Internet bandwidth). This problem is exacerbated when any new, relevant server data must get to the client system(s) with sufficient speed so that users of the client computer system(s) perceive that they are receiving data in real-time. The magnitude of these problems greatly increases as the number of mutually communicating communicators goes up.

The limitations of conventional, intermittent network communication has been addressed in various ways. For example, a streaming feed from a server computer to a client, over the Internet, may be provided to persistently transmit data (e.g., audio-video data) from the server to the client. As a different example, dedicated software, such as Internet Relay Chat ("IRC"), is used to set up chat rooms, wherein a multiplicity of remote computers can mutually send text-based messages in real time in the setting of a chat room, and the server calls back to the clients to distribute new chat data input into the system by a give participant.

Some types of connections, such as audio-video streaming and chat rooms, have their own shortcomings. For example, these types of communication may not be consistent with the use of a firewall due to their use of non-standard network ports and/or their initiation of connections from server to client (server call-backs) and/or the protocol under which they communicate data. These potential solutions also have limitations on the type of data that can be communicated. These potential solutions are thought to be especially unsuited for computer network application collaboration over the Internet, wherein two or more mutually-remote clients concurrently and simultaneously access and control an application (e.g., a word processing application on a remote server machine) over a computer network across one or more firewalls.

SUMMARY OF THE INVENTION

The present application deals with manipulation of computer network transport protocols so that transport protocols are optimized for purposes of effective network communication, especially with a view to network communication necessary to allow collaborative use of applications by mutually-remote users.

This optimization sometimes involves being sensitive to the way client computers and firewalls operate so that persistent connections, blocking-on-a-read communications, keep-alive communications, stateful communications and the like can be effected through various types of firewalls. This optimization can also involve sensitivity to transport protocols in order to facilitate quick and efficient communication within a network of server computers. In many cases, the best transport protocol for the client computer subsystems is not the same as the best transport protocol for the server computer subsystem.

Given these imperatives, some embodiments of the present invention have a computer program for translating between protocols so that data communications manifest different and optimal transport protocols at both the server and client ends of the computer system. For example, some firewalls (usually client firewalls) are highly amenable to stateful, HTTP 1.1 keep-alive connections via port 80. Other types of firewalls (usually server firewalls) are configured to allow stateful, persistent communication through non-reserved network ports under other protocols, such as protocols for object serialization. The present invention can help achieve persistent (and preferably real-time) communication over a computer network that has these and/or other types of protocols by translating data between transport protocols, such that the transport protocols chosen are suited for persistent communication through the relevant firewalls.

Some embodiments of the present invention include a server that has multiple threads and sends data over persistent connections to one or more client computer systems. For example, server computer system for a real-time, collaborative application (e.g., a collaborative scheduling program) may use multiple threads for multiple client-collaborator computer systems, and send back data to these client collaborators under HTTP 1.1 protocol in real-time through persistent, stateful, keep-alive connections which were originated through port 80 of each client's firewall.

The present invention deals with computer network architecture and software for facilitating real-time communications. The present invention is thought to be especially helpful in the context of real-time communication in the context of a computer system including one or more firewalls. The most preferred embodiments of the present invention involve real-time application collaboration.

At least some embodiments of the present invention may exhibit one or more of the following objects, advantages and benefits:

(1) real-time communication and/or collaboration over a computer network, such as the Internet;

(2) highly scalable communication and/or collaboration over a computer network, such as the Internet;

(3) collaboration and/or communication over a computer network in a way that is highly amenable to security features and firewalls;

the scope of the invention, and various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and are not to be construed as limiting the scope of the present invention. In the drawings.

DETAILED DESCRIPTION OF THE PREFERRED EMBODIMENTS

Figure 1:
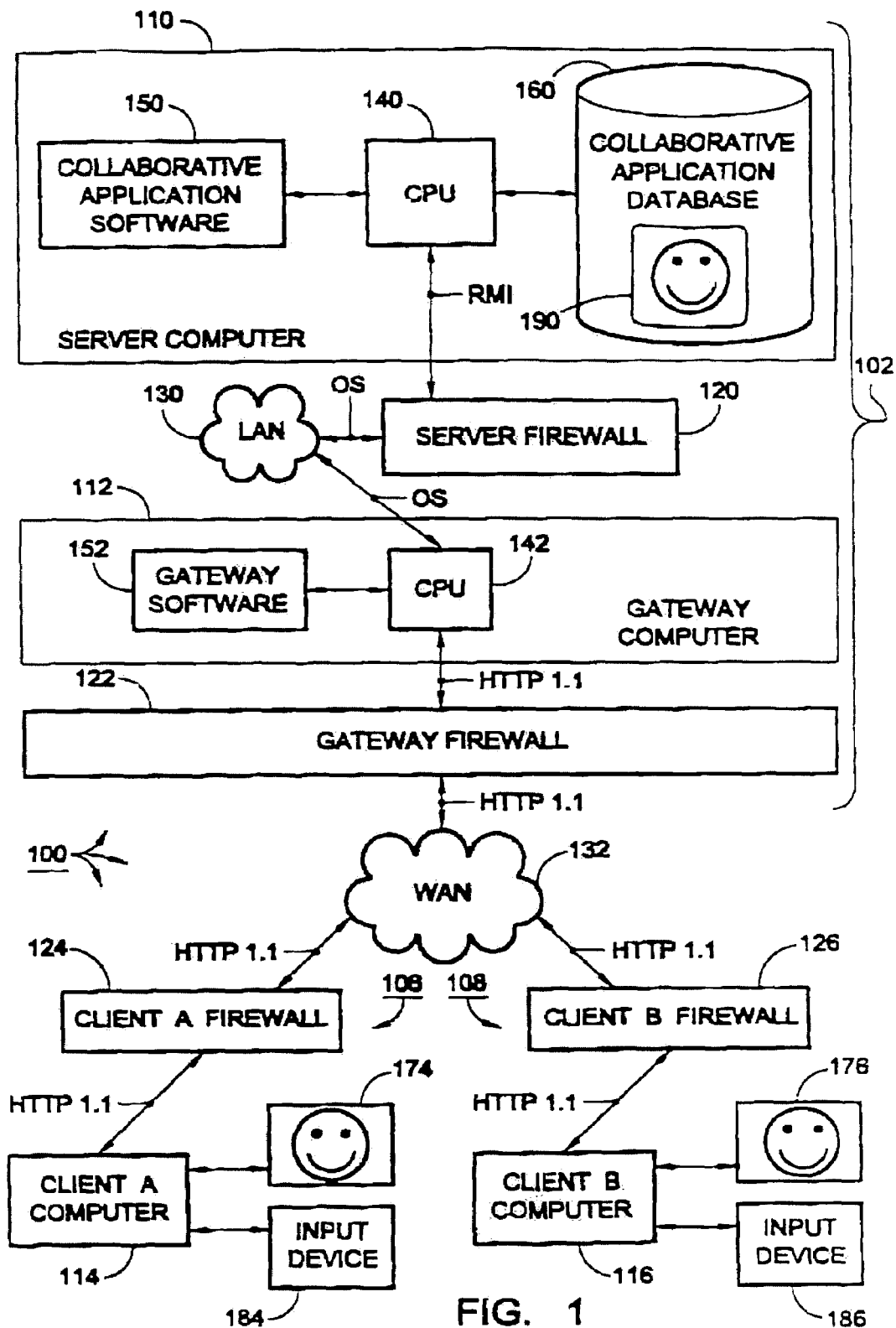
FIG. 1 is a block diagram of a first embodiment of a computer system according to the present invention.

Before commencing a description of the Figures, some terms will now be defined.

Definitions gateway software: machine readable instructions for translating data (e.g. data packets) between two different protocols; it is noted that "gateway" is used here in its well-established nominative sense, and does not refer to the goods, services or affiliations of any particular commercial entity.

computer network: is inclusive of wired networks, wireless networks and hybrid networks including wireless and wired portions.

computer system: computer or network of computers.

computer subsystem: a computer or network of computers; usually part of a larger system.

transport protocol: any computer data protocol that affects the manner in which data is handled at a firewall; it is noted that protocols are conventionally organized according to a hierarchy of protocols of several levels, such as transmission control level protocols, internet level protocols, IP level data protocols, data packet protocols and the like; however, transport protocols, as that term is used herein, does not necessarily refer to any one level in this hierarchy; rather, transport protocol is protocol data at any level that effects how data is handled at a firewall; now, and in the future, firewalls may scrutinize protocols at more than one level of the currently-existing hierarchy; transport protocols, as that term is used herein is made up of protocols, or portions of protocols, or combinations of portions of protocols that are utilized by firewalls in determining how to handle data attempting to get across the firewall.

application: a set of machine readable code including at least one machine readable instruction.

collaborative application: an application capable of concurrently receiving input from and providing output to at least two people at two different computers.

real-time: characterized by data transmission delays sufficiently short (in the aggregate) so that a reasonable person would perceive the transmission as if it took place without any delay.

persistent: persistent virtual circuit connection.

stateless and stateful: stateful and stateless are words that denote whether or not a computer network communication system is designed to remember one or more preceding events in a given sequence of interactions. Stateful means the system keeps track of the state of interaction, usually by setting values in a storage field designated for that purpose. Stateless means there is no record of previous interactions and each interaction request has to be handled based entirely on information that comes with it.

first . . . communication: while the claims speak in terms of first communication, second communication, third communication, and so on, labels of "first," "second," "third" and so on are not intended to imply anything about the relative timing of the communications (although any given claim, read as a whole, implicitly or explicitly imply some relative timing of communications); in other words, a "third network communication" may occur earlier in time than a "first network communication," so long as this relative timing is consistent with all of the rest of the claim language; also, the phrase "first . . . communication" does not imply that there have not been earlier communications in the computer system; in many if not most embodiments of the present invention, communications will occur prior to the "first . . . communication" dealt with in any given claim.

thread: a sequence of computer program instructions that are scheduled for execution independently of other sequences of computer program instructions within a single computer program; for example, modern computer programming languages (eg., Java) provide language support for threads in order to facilitate for concurrent programming and improved appearance of program multi-tasking.

communication software: software that helps control network communications located or distributed anywhere in a computer system.

To the extent that the definitions provided above are consistent with ordinary, plain and accustomed meanings (as generally evidenced, inter alia, by dictionaries and/or technical lexicons), the above definitions shall be considered supplemental in nature. To the extent that the definitions provided above are inconsistent with ordinary, plain and accustomed meanings (as generally evidenced, inter alia, by dictionaries and/or technical lexicons), the above definitions shall control. If the definitions provided above are broader than the ordinary, plain and accustomed meanings in some aspect, then the above definitions will control at least in relation to their broader aspects.

To the extent that a patentee may act as its own lexicographer under applicable law, it is hereby further directed that all words appearing in the claims section, except for the above-defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate ordinary, plain and accustomed meanings (as generally evidenced, inter alia, by dictionaries and/or technical lexicons), in the situation where a word or term used in the claims has more than one alternative ordinary, plain and accustomed meaning and the specification is helpful in choosing between the alternatives.

Preferred Computer Architecture

FIG. 1 shows an exemplary computer system 100 according to the present invention. As shown in FIG. 1, server computer subsystem 102, client A computer subsystem 106 and client B computer subsystem 108 are connected by wide area network ("WAN") 132. Server computer subsystem 102 is a computer system designed to run business collaboration software, allowing multiple users at multiple, mutually-remote locations to simultaneously access and manipulate a single set of computer application data (e.g., a word processing document). Preferably, manipulations of the various users will be effectively communicated to the other users in real-time, in order to allow a kind and quality of business communication and/or a level of teamwork that is not achievable by conventional voice communication (e.g., by telephone), email communication or computer file transfer.

Client A computer subsystem 106 and client B computer subsystem 108 are the computer subsystems respectively utilized by two mutually-remote collaborators to do a business collaboration. WAN 132 collaboratively connects the users to each other through the intermediary of server computer subsystem 102. WAN 132 is preferably the Internet. Alternatively, WAN 132 could be any other kind of computer network, capable of connecting remote computers, that exists now, or may be developed in the future. WAN 132 may be wire-based, wireless or a combination of these types.

The architecture of server computer subsystem 102 will now be discussed in detail. Server computer subsystem 102 includes server computer 110, server firewall 120, local area network ("LAN") 130, gateway computer 112 and gateway firewall 122.

Server computer 110 includes central processing unit (CPU) 140, collaborative application software 150 and collaborative application database 160. While the server computer is shown as a single block in FIG. 1, in many alternative embodiments, server computer 110 will be distributed over several interconnected computers. For example, collaborative application database 160 may reside on a separate computer, preferably equipped with database management software, such as ORACLE database software. It is noted that the word ORACLE may be subject to trademark rights.

Generally speaking, server computer 110 hosts the application that will be collaboratively used by the mutually remote users, such as client A and client B. The application may be a word processor, a task scheduling tool, a graphics program, a presentation program, a spreadsheet, a game, a music studio or any other type of computer application that is conventional or may be developed. Whatever the application, the present invention can help client A and client B truly work together, preferably in real-time, on the subject matter of the shared application. For example, the subject matter may be a text document, a graphic, a game performance or a song.

Server computer 110 is preferably a conventional server or mini-server computer. Preferably, the server computer utilizes "Java Distributed Oriented Technology" (or "JDOT") wherein the application server is written completely in JAVA. It is noted that the words JAVA and JDOT and/or the phrase "Java Distributed Oriented Technology" may be subject to trademark rights.

From a high-level, a JDOT server provides a framework for fine-grained data security, interfacing with secondary storage (both SQL databases and LDAP directories), transaction management, caching, and a standard architectural framework for building specific business logic services. Among the most important features of a JDOT server is the efficient, real-time (e.g., sub-second) updating of multiple networked clients, ultimately facilitating real-time network collaboration among multiple participants. According to JDOT, collaborative data distribution services are based algorithmically at the highest level on the Observer pattern, as described by "Design Patterns: Elements of Reusable Object-Oriented Software" by Erich Gamma, et al. The JDOT server's services implement an efficient, firewall-compliant, distributed observer system.

For present purposes, it is noted that JDOT servers, and other similar servers, are often most amenable to persistent network communications using raw socket data, protocols for object serialization and/or remote method invocation protocol. Often JDOT servers are not very amenable to HTTP 1.1 protocol data and associated persistent connections of the type originated through port 80 of a firewall.

CPU 140 receives data from client A and client B, and uses this data to manipulate collaborative application data, such as a text document that client A and client B are working on together. CPU 140 performs the collaborative application work by following the machine readable instructions of collaborative application software 150.

Collaborative application software 150 is the application. In other preferred embodiments, there may be more than one kind of application available in the server computer subsystem 102, and these multiple applications may or may not be stored on separate server computers connected by LAN 130. Collaborative application software may be stored in read-only memory, random access memory, a data storage medium, or a combination of these storage expedients, as is conventional. As will be discussed below, collaborative application software 150 is designed to receive data from client A, client B, and other clients, wherein the data is characterized by some predetermined transport protocol.

The identity of this predetermined transport protocol will become important as the remainder of the architecture and the functionality of computer system 100 is discussed below.

Collaborative application database 160 is preferably a conventional computer database, as discussed above. Collaborative application database 160 stores the data for the collaborative application. For example, if the application is a collaborative word processor, the word processor program would comprise collaborative application software 150, and the word processing file (that is, machine readable data representing the actual document text and formatting) would comprise collaborative application database 160. Collaborative application database 160 may store other data related to the collaborative application software, such as lists of remote computers and/or users who are properly authorized to use collaborative application software 150.

As shown in FIG. 1, server computer 110 is positioned behind server firewall 120. Server firewall 120 is a conventional hardware-based and/or software-based fire wall. To provide some examples, server firewall 120 may take the form of software residing on server computer 110, software on a dedicated computer, or it may take the form of a hardware component.

As is conventional with firewalls, server firewall 120 is configured to have a plurality of "ports." Each port has an associated set of rules for scrutinizing data packets attempting to pass through the port. For example, a port may only let data of certain protocols through. Also, the rules may require the firewall to extract the substantive data from the data packet, in order to perform checks on the content of the data. As is common to many firewalls, server firewall 120 applies different, and much stricter, rules to data packets coming into server 110 than to data packets emanating from server computer 110. However, if a persistent connection is established, then data passage is persistent, fast and efficient in both directions.

It is noted that server firewall 120 stands between a local area network (LAN 130) and a server computer (server computer 110). As a practical matter, this may have an effect on how the operator of server computer subsystem 102 chooses to configure server firewall 120. For example, since the firewall does not stand directly adjacent to the Internet, this can have an effect on the preferred server firewall configuration. Also, because the data stored on server computers (and their databases) can be extremely sensitive, this may also have an effect on firewall configuration.

For present purposes, it is important to note that server firewall 122, for these types of reasons, may be configured differently from other firewalls of computer system 100 shown in FIG. 1, such as gateway firewall 122, client A firewall 124 and client B firewall 126. Because server firewall 122 is differently configured, it may not be able to establish the same variety of persistent connection as the other firewalls, which is one reason that transport protocol conversion (or translation) is performed, as explained in more detail below.

Moving now to LAN 130, this component is formed as a conventional local area network or intranet. This LAN 130, and the rest of server computer system 102, may be maintained by a business that employs collaborators client A and client B, or alternatively, it could be maintained by a third party computer services provider.

In this preferred embodiment, LAN 130 allows communication of data related to the collaborative application to be communicated between server computer 110 and gateway computer 112. In other preferred embodiments, the LAN may allow communication between gateway computer 112 and several server computers, which cooperatively share in implementing a collaborative application. Other embodiments will not include a LAN at all. For example, in some embodiments, the server computer subsystem 102 may take the form of a single computer having both gateway software 152 and collaborative application software 150, which would obviate the need for networking on the server side.

Gateway computer 112 includes CPU 142 and gateway software 152. Preferably, gateway computer 112 is implemented as a stand-alone computer, a server computer or a mini-server computer. Gateway computer 138 is preferably a Web server with Web server software supporting the HTTP protocol with keep-alive facilities.

Gateway software 152 is a set of machine readable instructions that are executed by CPU 142. Gateway software 142 may be stored in read-only memory, random access memory, a data storage medium, or a combination of these storage expedients, as is conventional. Gateway software 152 routes and manipulates data packets coming into server computer subsystem 102 from WAN 132, as well as data packets going out from server computer subsystem 102 to WAN 132. First, the routing function will be briefly described, followed by the manipulation of the incoming and outgoing data packets. Gateway software 142 is preferably arranged as a plug-in to Web server software (not separately shown) in gateway computer 112.

The routing function of gateway software 152 primarily insures that data packets get to the correct server computer. Of course, in the embodiment of FIG. 1 there is only one server computer 112, so this routing function is trivial in this embodiment. However, if the collaborative application database were stored on a separate computer from the collaborative application software (as in many preferred embodiments), then gateway software 152 would control the routing of data packets so that they would go to the appropriate computer. The routing function is not described in great detail herein because it is highly dependent on the exact server hardware and software setup, and because once the server setup is determined, the routing function is then thought to be a matter of ordinary and routine skill.

Gateway software 152 also changes the transport protocol of both the incoming (from WAN 132) and outgoing (from LAN 130) data packets. Because this transport protocol translation is an important part of some embodiments of the present invention, transport protocols and the protocol translation of gateway software 152 will be discussed in more detail in the process flow section of this specification.

For the time being, a specific preferred example of the transport protocol translation effected by gateway software 152 will be explained. Gateway software 152 translates incoming data packets having a transport protocol called hypertext transfer protocol 1.1 ("HTTP 1.1") into corresponding data packets having a protocol for object serialization (labeled OS in FIG. 1). After the incoming packets are translated, they are sent on to LAN 130, server firewall 120 and server computer 110, as appropriate. Gateway software 152 also translates outgoing data packets in the protocol for object serialization OS into corresponding data packets having an HTTP 1.1 transport protocol. After the outgoing packets are translated, they are sent on to gateway firewall 122, WAN 132, and the clients, as appropriate. As a result of the transport protocol translation, as shown in FIG. 1, data transmission connections on the server computer side of gateway computer 112 are labeled OS, while the data transmission connections on the client side of gateway computer 112 are labeled HTTP 1.1.

One major reason for this protocol translation step is that different transport protocols respectively work better on server and client sides of computer system 100, as will now be discussed. HTTP 1.1 data packets work better with gateway firewall 122, client A firewall 124 and client B firewall 126. The HTTP 1.1 packets work better in the sense that they can be used in connection with a persistent, "keep-alive" connection originated through port 80 that many typical client firewalls are pre-configured to allow, without the need to reconfigure the firewall. On the other hand, the protocol for object serialization OS works better with much typical server hardware. For example, many server firewalls are configured to allow OS transport protocol data packets to freely pass through an unreserved port (e.g., port 8899). Also, much collaborative application software is compatible, or works more efficiently, with OS data packets, or with data according to other transport protocols, such as raw sockets.

By performing transport protocol translation, especially in the context of collaborative applications, data packets will be more amenable to persistent connections across the various firewalls commonly observed in computer systems. These persistent connections can very effectively be used to use threads at both the client and server sides that block on a read at the socket. This blocking on a read, whether on the client side or on the server side, allows new data to be received quickly without using a lot of resources of the client computers and the server computer(s).

There are also a couple of potential advantages achieved by performing transport protocol translation in dedicated gateway computer 152, as opposed to performing this translation in server computer 110. First, the gateway computer adds an extra layer of security between WAN 132 and the sensitive information on server computer 110. Because transport protocol is changed at gateway computer, it is thought that it will be considerably more difficult for unauthorized parties (e.g., hackers) to access server computer 110 from WAN 132. Second, server computer resources 110 do not need to be used to either translate protocol or to otherwise deal with incoming data that does not exhibit a transport protocol (e.g., OS) preferred by collaborative application software 150. Third, in embodiments where there are several server computers, the necessary transport protocol translation is performed at one central location (ie, gateway computer 152), rather than at several different places in the server subsystem.

Gateway firewall 122 is interposed between WAN 132 and gateway computer 112. Gateway firewall 122 is configured to allow a persistent, blocking on a read, keep-alive type connection for HTTP 1.1 transport protocol data. This kind of persistent connection is preferably originated through port 80 of a firewall. Gateway firewall 122 is a conventional hardware-based and/or software based firewall. Gateway firewall 122 applies different, and much stricter, rules to data packets coming into gateway computer 112 than to data packets emanating from gateway computer 112. However, if a keep-alive connection is established (for data with the appropriate transport protocol), then data passage is persistent, fast and efficient in both directions.

Now, client A computer subsystem 106 will be discussed. Client A computer subsystem 106 includes client A firewall 124, client A computer 114, display device 174 and input device 184.

Client A firewall 124 is configured to allow a persistent, blocking on a read, keep-alive connection, as long as the data exhibits the HTTP 1.1 transport protocol. This persistent connection is preferably originated through port 80 of the firewall. It is an important feature of some collaborative application software system embodiments of the present invention to have a persistent connection across the firewall. It is important for some embodiments of the present invention that the persistent connection across the firewall allows the computer behind the firewall to block on a read, instead of having to expend the resources necessary to perform polling. In conventional collaborative application software applications, intermittent connections, such as polling are used. These intermittent connections generally require a lot of computing resources of the client computer, do not scale well as more and more remote users want to participate in the collaborative application. Client A firewall 124 also does not allow connections to client A from computer systems outside of it, also known as a call-back.

It is an important feature of some collaborative application software embodiments of the present invention that a thread and an associated blocking on a read type connection is used. This kind of connection saves computing resources system-wide, especially at client A computer 114. This is because a blocking on a read connection allows a thread of client A computer to "sleep" unless and until there is new data to be received from server computer subsystem 102 over WAN 132.

Client A 114 computer is preferably a conventional desktop or laptop personal computer. Display device 174 preferably includes a monitor or LCD display, and may also include other output devices, such as a printer, audio speakers and the like. Input device 184 preferably includes a keyboard and a mouse, and may include other input devices, such as a scanner.

Client B computer system 108 includes client B firewall 126, client B computer 116, display device 176 and input device 186. The components of client B computer system 108 are similar to the corresponding components of client A computer system and will therefore not be further discussed.

Before leaving FIG. 1, the "happy face" displays at display device 174, display device 184 and in collaborative application database 160 will be discussed. In this exemplary embodiment, the collaborative application software is a graphics program. Client A and client B are collaborating in generating a new graphic, which is turning out to be a happy face. At the time of FIG. 1, client A is working on adding a second eye to the happy face using her input device 184.

After client A manipulates input device 184 to indicate the addition of the second eye, client A computer 114 converts this input into appropriate HTTP 1.1 data packets. These data packets include substantive application input data to be used by the collaborative application software 150 and collaborative application database 160, and ultimately by other collaborators present on WAN 132. These HTTP 1.1 packets travel unimpeded through the keep-alive connection in client A firewall 124, through WAN 132, and (again unimpeded) through a keep-alive connection in gateway firewall 122, before reaching gateway computer 112. Gateway computer has established a client thread ready to receive this communication through a blocking on a read connection.

At gateway computer 112, gateway software 152 translates these data packets from HTTP 1.1 transport protocol into OS protocol and send the corresponding OS packets on to LAN 130, server firewall 120 and finally to server computer 110. As explained above, the OS packets pass unimpeded through an unreserved port of server firewall 120. Server computer has established a client A thread, ready to receive this communication by waking up appropriate components in server computer 110 when the communication arrives. Server computer also has other threads established for other collaborators, such as client B. These threads, while standing ready to receive new application input data from various sources, do not take up too much of the server computer's computing resources because they allow components to sleep, unless and until new data comes in.

In server computer 110, collaborative application software 150 recognizes that the data packets being received on the client A thread are designed to add a second eye to the happy face image. As shown in FIG. 1 at reference numeral 190, the application data file corresponding to the happy face image is updated in collaborative application database 160. The happy face is complete, at least in the server computer subsystem 102.

However, the second eye data still needs to back to the computers of the collaborators, client A and client B. Therefore, server computer 110 sends this data back, initially as OS data packets. The OS data packets are converted to corresponding HTTP 1.1 data packets at gateway computer 112, and then sent the rest of the way back to client A computer 114 and client B computer 116. At the time of FIG. 1, the HTTP 1.1 packets have not yet reached client A computer 114 and client B computer 116, so the second eye is not yet shown on display device 174 and display device 184.

The second eye data packets preferably reach the client computers with sufficient (e.g., sub-second) speed, such that client A and client B perceive that they are collaborating in real-time. This fast, and preferably real-time, business collaboration is facilitated by the fact that the client computers receive data through a persistent, keep-alive connection across their respective firewalls and because gateway software 152 translates transport protocols so that the necessary data transfers can be quickly made across the differently-configured firewalls 120, 122, 124 and 126 of computer system 100.

Also, the persistent and stateful connections allow the use of threads and of blocking on a read type connections, which save on computing resources at all computers in computer system 100. By making sure that data packets have an appropriate transport protocol at all stages of the network communication, these persistent and stateful connections and the associated use of threads and blocking on a read become possible.

Process Flow for Setting Up Persistent Connections

Figure 2:
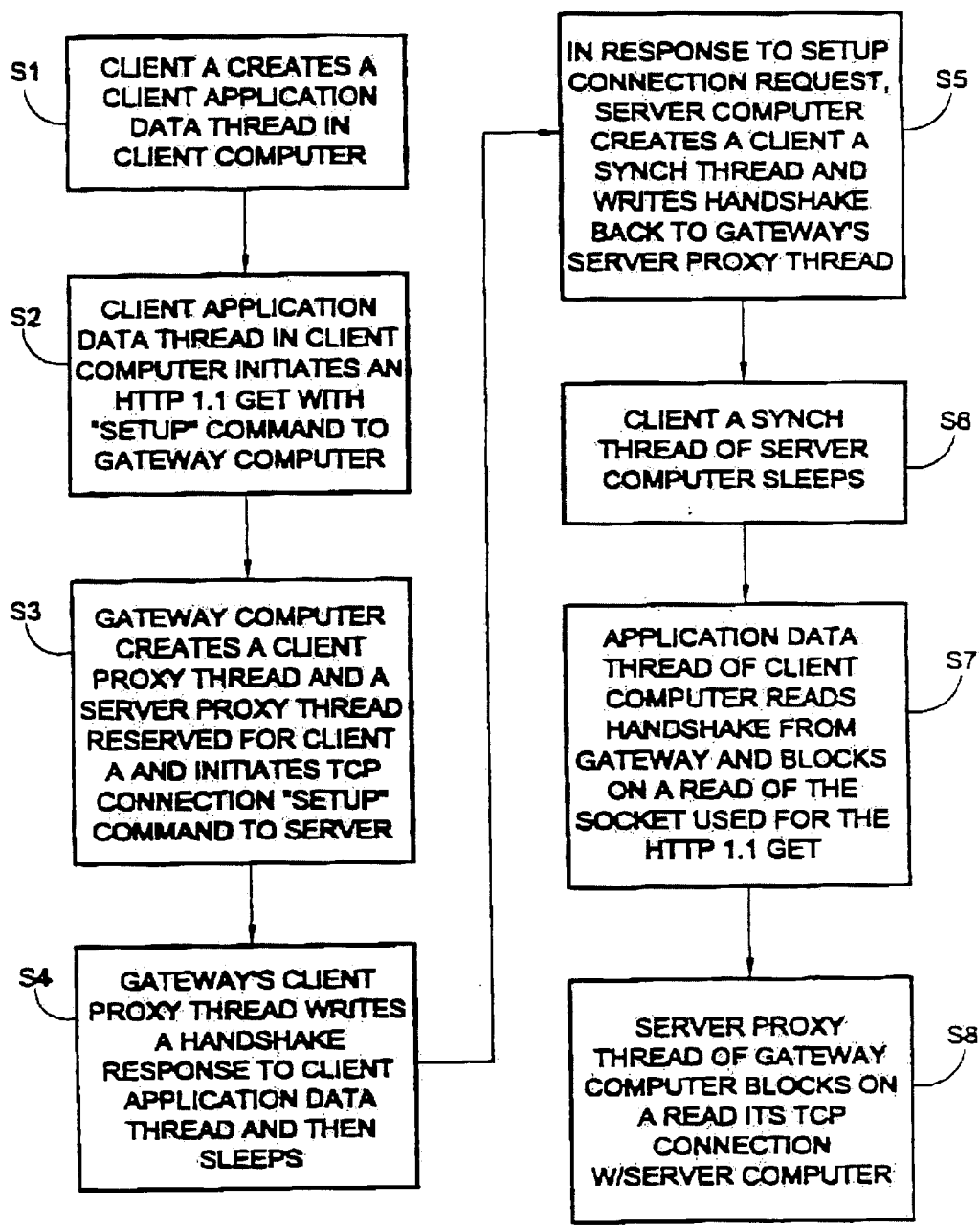
FIG. 2 is a flowchart of exemplary process flow for establishing persistent connections according to the present invention.

As discussed above, there are persistent data transmission connections between the client computers and the gateway, as well as between the gateway computer and the server computer(s). Now exemplary process flow (as shown in the flowchart of FIG. 2) for establishing these persistent connections will be discussed.

At step S1, client A computer 112 creates an application data thread in the client A computer. Processing proceeds to step S2, where the application data thread in the client A computer initiates an HTTP 1.1 GET with "setup" command, and sends this GET and setup command to gateway computer 112, through WAN 132 and gateway firewall 122. Gateway firewall 122 is configured to allow passage of such a GET and "setup" command. The GET and setup command requests the connection be a keep-alive connection, suitable for persistent data transmission originating through port 80 of client A firewall 124.

Processing proceeds to step S3, where gateway computer 112 creates two threads in response to the GET and "setup" command. Gateway computer 112 creates a client proxy thread for communications with client A computer 114. Gateway computer 112 also creates a server proxy thread for communications with server computer 110. At step S3, gateway computer 112 also initiates a TCP connection with "setup" command to server computer 110. This TCP connection is a persistent data communication path for data according to the OS protocol (as opposed to HTTP 1.1), because this transport protocol works better with server computer 110.

Processing proceeds to step S4, where the client proxy thread in gateway computer 114 writes a handshake response to the client application data thread of client A computer 114 and then sleeps.

Processing proceeds to step S5, where server computer 126, after accepting the new TCP connection with "setup" command from gateway computer 114, creates a client A synch thread for communication with client A computer 114 (via gateway computer 112). Server computer 110 preferably has one thread for each client. If client A is the only one working on the collaborative application, then the server computer may have but one client synch thread.

Of course, collaborative applications are designed to be worked on by more than one client at a time, so server computer 110 will often need to set up and maintain more than one client synch thread. By the expedients of threads and associated blocking on a read type connections, the collaborative application becomes highly scalable, because the plurality of client synch threads at the server computer will permit communication with many parties without using too much of the server computer's computing resources. Finally at step S5, server computer 110 writes a handshake back to the gateway computer's server proxy thread.

Processing proceeds to step S6, where the client A synch thread is put to sleep, to await further communications and data that requires distribution to the client A computer system. Because client synch threads can be put to sleep in the context of a persistent connection, this conserves computing resources of the server computer.

Processing proceeds to step S7, where the client application data thread of client A computer 114 receives the handshake response sent by gateway computer 112 at step S4. Upon receiving the handshake response, client A computer 114 blocks on a read of the socket used to send the initial HTTP 1.1 GET from Fig. S1. This allows a persistent, keep-alive connection between gateway computer 114 (and ultimately server computer 110) and client A computer 114, even though the client application data thread is put to sleep, to conserve computing resources, when application data is not being received from gateway computer 114.

Processing proceeds to step S8, where the server proxy thread of gateway computer 114 blocks on a read of its TCP connection with server computer 110. This allows a persistent OS connection between gateway computer 112 and server computer 110, even though the server proxy thread is put to sleep, to conserve computing resources, when application data is not being sent from the gateway to the server.

Process Flow for Gateway

Figure 3:
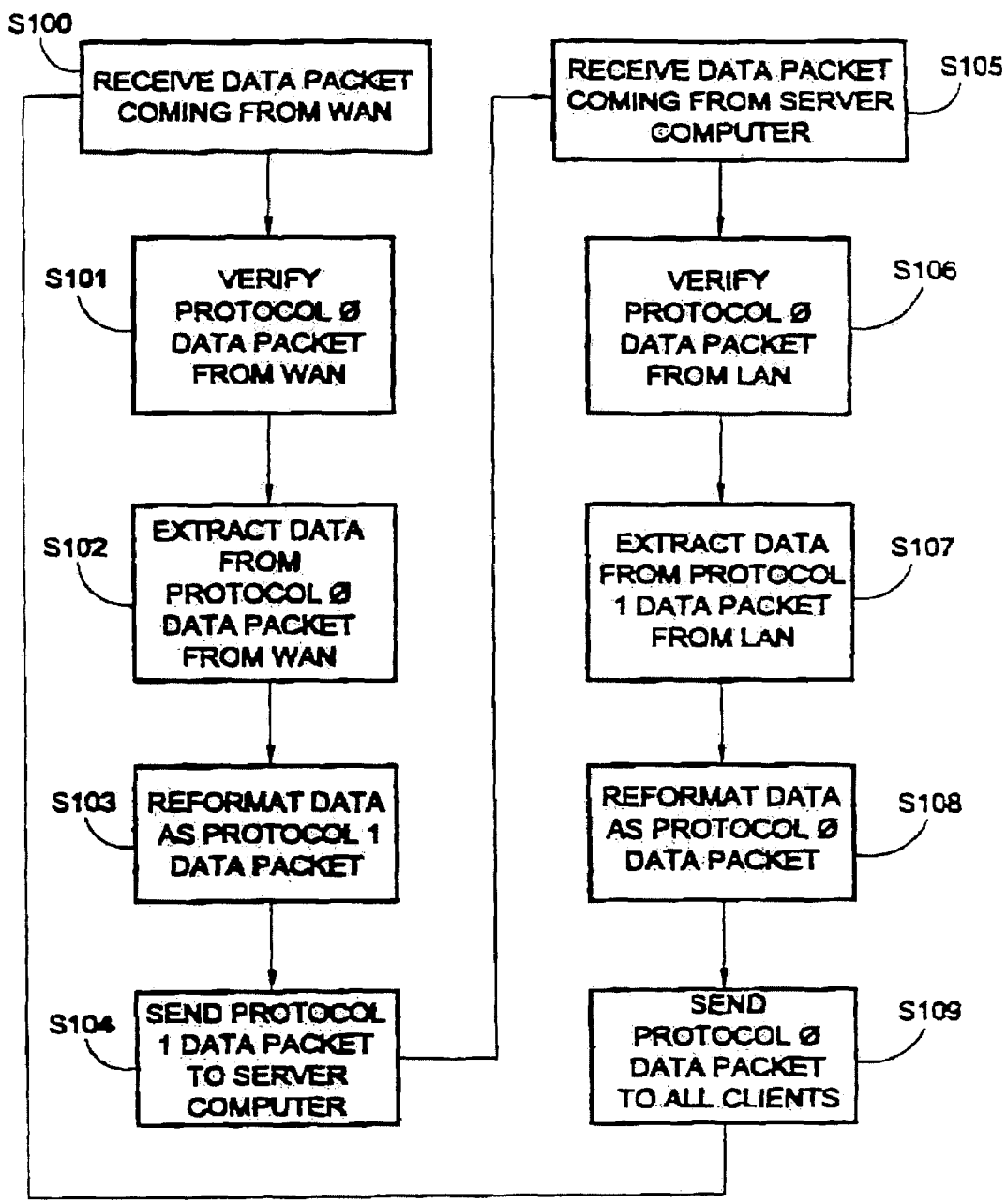
FIG. 3 is a flowchart of exemplary process flow of gateway software according to the present invention.

Exemplary process flow of gateway software will now be discussed in connection with FIGS. 3 to 5. This process flow illustrates a well-known process called "protocol tunneling", which is utilized in the present invention for maintaining different kinds of persistent connections across different firewalls. At step S100, the gateway software receives a connection and data from client A (via WAN 132). Processing proceeds to step S101.

At step S101, the gateway software verifies the transport protocol of the data packet received from client A. In this simplified example, instead of using the relatively complex preferred transport protocols of HTTP 1.1 and OS, hypothetical transport protocols protocol 0 and protocol 1 will be used for illustration purposes. According to the present invention, translation between transport protocol 0 and transport protocol 1 would be especially advantageous when: (1) the components on one side of the gateway software are designed to permit a persistent connection with respect to transport protocol 0 data (but not transport protocol 1 data); and (2) the components on the other side of the gateway software are designed to permit a persistent, firewall-compliant connection with respect to transport protocol 1 data (but not transport protocol 0 data).

Figure 4:
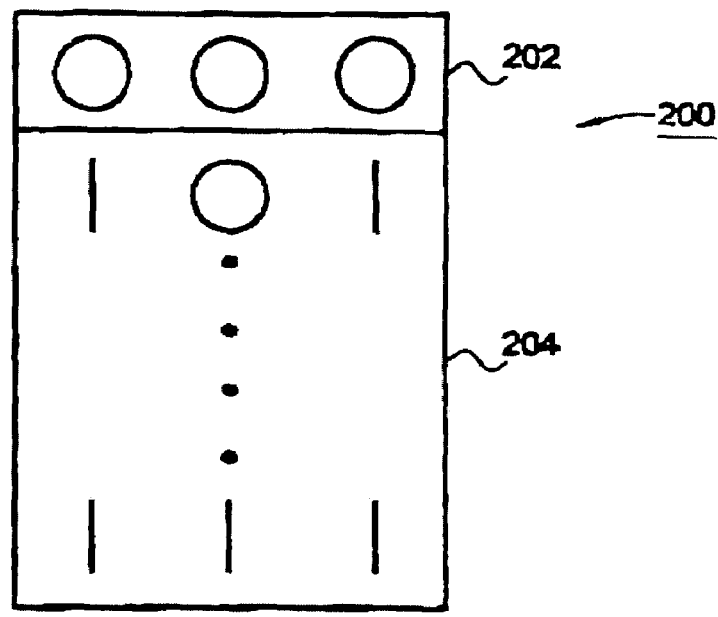
FIG. 4 is a diagram of an exemplary transport protocol 0 data packet.

FIG. 4 shows data packet 200, according to transport protocol 0. In this example, transport protocol 0 is the transport protocol used for communication between gateway computer 112 and client A computer 114. Transport protocol 0 data packets can be identified because they have a 3-bit header 202 that has the value 000. Transport protocol 0 also has a data portion 204 with substantive data, which can be extracted from the packet.

In this example, at step S101, gateway software 152 verifies that the transport protocol of the data packet received from client A is transport protocol 0 by checking the header to determine that its value is 000. If more complex transport protocols are used, the process for verifying the transport protocol may be more complex, depending on the nature of the transport protocol, but would be within ordinary and routine skill as long as the characteristics of the transport protocol are known. At step S101, other aspects of the data packet may be checked, such as source or routing information.

Processing then proceeds to step S102 where the data 204 is extracted from data packet 200. This is done because the transport protocol of the packet is being changed to be more amenable to the server side of gateway computer 112, but the substantive data should remain true.

Figure 5:
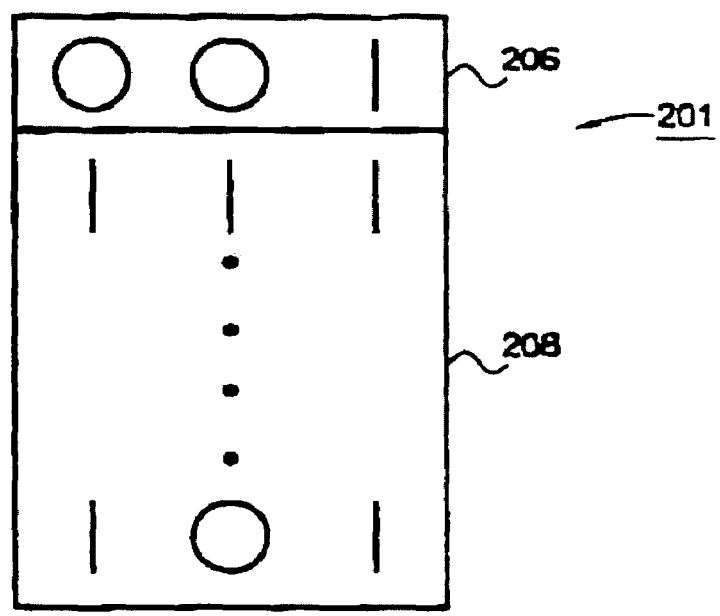
FIG. 5 is a diagram of an exemplary transport protocol 1 data packet.

Processing then proceeds to step S103, where the transport protocol 0 data packet is reformatted as a protocol 1 data packet 201, as shown in FIG. 5. As further shown in FIG. 5, transport protocol 1 data packet 201 also has a three-bit header 206. However, this header takes the value 001 in order to identify packet 201 as a transport protocol 1 packet. Gateway software 142 adds this header to the translated data packet at step S103. The substantive data from data packet 200 is used as substantive data portion 208 of transport protocol 1 data packet 201.

However, in this example, the data of packet 201 is in the reverse order as the data in data packet 200 (compare FIG. 4 with FIG. 5). This is because the respective transport protocols 0 and 1 happen to mandate different data ordering. This feature of this hypothetical example demonstrates that other processing, besides merely changing the header, may need to be performed by gateway software in order to keep the substantive data identical. Different transport protocols may have profound effects on the structure of a data packet, as a whole. Gateway software 152 must take care of effecting all of the necessary data packet structural changes.

Processing proceeds to step S104, where the protocol 1 data packet is sent from gateway computer 112 to server computer 110. The packet now has the appropriate transport protocol 1 to be communicated by a persistent connection to server computer 100.

Processing then proceeds to step S105, where gateway software 152 block on a read in order to receive response data packets from the server computer. When there is a data packet from the server (via LAN 130), then processing proceeds to step S106.

In this example, at step S106, gateway software 152 verifies that the transport protocol is transport protocol 1 by checking the header to determine that its value is 001. At step S106, other aspects of the data packet may be checked, such as source or routing information.

Processing then proceeds to step S1107 where the data 208 is extracted from data packet 201 (see FIG. 5). This is done because the transport protocol of the packet is being changed to be more amenable to the client side of gateway computer 112, but the substantive data should remain true.

Processing then proceeds to step S1108, where the transport protocol 1 data packet is reformatted as a transport protocol 0 packet (example shown in FIG. 4). Gateway software 152 adds the 000 header, identifying the new packet as a transport protocol 0 packet, at step S108. The substantive data from data packet 201 is used as substantive data portion 206 of transport protocol 0 data packet 200, but (for reasons explained above) the order of the data is reversed.

Processing proceeds to step S109, where the transport protocol 0 data packet is sent from gateway computer 112 to client A computer 114 and client B computer 116. Because the packet now has the appropriate transport protocol 0 for the client firewalls 124, 126 and client computers 114, 116, it can travel by a persistent connection to client computers 114, 115. More particularly, it will travel back to the clients and will be recognized by the clients as a correct protocol 0 response.

The foregoing exemplary process flow embodiment has been simplified to more clearly illustrate the concept of transport protocol conversion. There are many other processes for accomplishing transport protocol conversion. For example, data going from the server to the client may be subject to transport protocol conversion (for the purpose of maintaining persistent connections in the server-to-client direction), while data going from client to server may not require transport protocol conversion or persistent connections.

ALTERNATIVE EMBODIMENT

Figure 6:
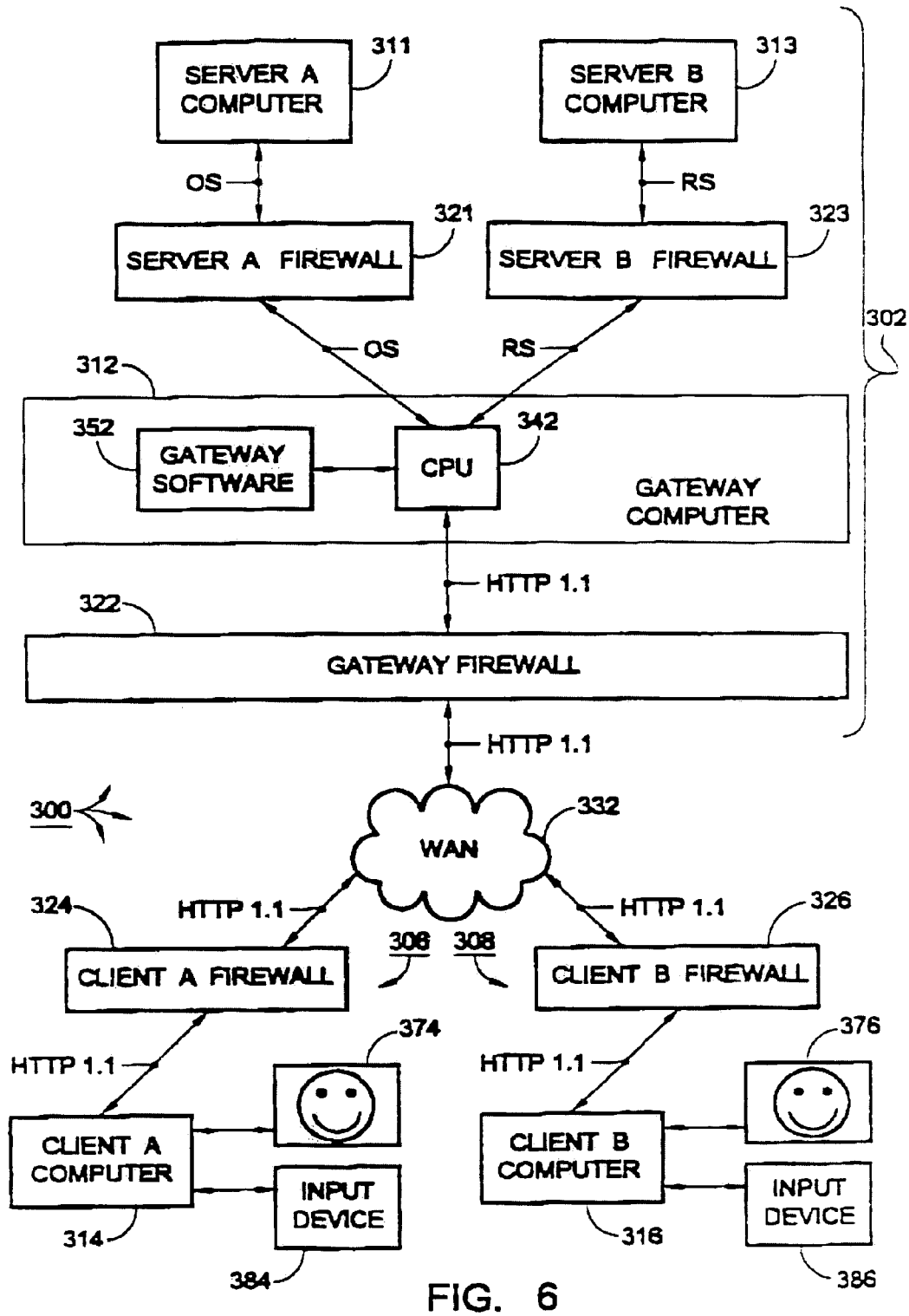
FIG. 6 is a block diagram of a second embodiment of a computer system according to the present invention.

FIG. 6 shows an alternative embodiment of a computer system 300 according to the present invention. This alternative embodiment features a dual server computer architecture, in order to demonstrate the server data routing and multiplexing function which can be provided by the gateway software and also to demonstrate that data routed to different server computers or from different server computers or different types of data routed to the same server computer may be controlled by the gateway software to be structured according to different transport protocols.

In computer system 300, components 306, 308, and 332 are respectively similar to components 106, 108, and 132 discussed above in connection with the embodiment of FIG. 1 and will not further be discussed in connection with this alternative embodiment.

Gateway computer 312 includes CPU 342 and gateway software 352. On the server side of gateway computer 312 are two server computers, server A computer 311 and server B computer 313. Server A 311 stands behind server A's firewall 321. Server B 313 stands behind server B's firewall 323.

In this exemplary embodiment, server A computer 311 handles connection control data and server B computer 313 handles data transport data. Because of the way server A computer 311 and server A firewall 321 are configured, the connection control data is best structured according to the OS transport protocol (discussed above). On the other hand, server B computer 313 and server B firewall 323 are configured to handle application data in the form of raw socket transport protocol. More particularly, raw socket data is sometimes considered to have no protocol whatsoever, but for purposes of this invention, raw socket data is considered to be one type of transport protocol, because the fact that data is arranged as raw sockets will generally have an impact on the way that data is handled at a firewall (see definition of transport protocol above). Perhaps raw socket data is best considered as the degenerate case of a transport protocol.

Server A firewall 321 is configured to allow a persistent connection, as long as the data traveling through the persistent connection exhibits the OS transport protocol. On the other hand, server B firewall 323 is configured such that a persistent connection is established therethrough, so long as the data is in the form of raw sockets RS.

Because this embodiment has two server computers, gateway software includes code that enables CPU 342 to determine whether data packets coming in from WAN 332 are connection control data, to be sent to server A computer 311, or data transport data packets, to be sent to server B computer 313. Gateway software 352 includes logic to route the data packets as appropriate. Gateway software includes code that handles two server synch threads with persistent connections to server A computer 311 and server B computer 313.

In addition to routing these packets, gateway software 352 also does transport protocol translation. However, instead of merely translating all data packets into OS transport protocol form, gateway software translates data packets headed to server A computer 311 from HTTP 1.1 transport protocol to OS transport protocol, so that these packets can pass through the persistent connection at server A firewall 321. On the other hand, gateway software 352 translates data packets headed for server B computer 313 from HTTP1.1 transport protocol into raw sockets, so that this data can pass through a persistent connection at server B firewall 323. These two persistent and stateful connections allow the servers to establish multiple client threads and efficiently handle the intermittent receipt of data from many different collaborators.

Of course, other transport protocols can be used now or in the future. One preferred transport protocol for some embodiments of the present invention is JAVA object serialization. Other preferred transport protocols are in the Common Object Request Broker Architecture (CORBA) family of protocols. It is expected that other types and perhaps even new hierarchies of protocols may be developed in the future, and this may have an effect on how firewalls of the future handle the data. In effect, this means that there will be new transport protocols in the future. However, it is thought that the present invention will still be useful when one type of transport protocol can be used to establish a persistent, firewall-compliant connection in one part of the computer network, and a different transport protocol can be used to establish a persistent, firewall-compliant connection in a different part of the computer system.

Many variations on the above-described computer system are possible. Such variations are not to be regarded as a departure from the spirit and scope of the invention, but rather as modifications intended to be encompassed within the scope of the following claims, to the fullest extent allowed by applicable law.

What is claimed is:

1. A method of communicating over a computer network, the method comprising the steps of:
   generating, by a collaborative application software residing on a server computer, an application output communication;
   sending, over a first computer network, the application output communication to a client firewall;
   communicating the application output communication across the client firewall through a hypertext transfer protocol keep-alive connection;
   receiving the application output data at a client computer; and
   keeping the hypertext transfer protocol keep-alive connection for the duration of a collaboration,
   wherein the client computer blocks on a read when waiting for and receiving the application output data.

2. The method of claim 1, further comprising the step of originating a connection across the client firewall through a port 80 of client firewall.

3. The method of claim 1 wherein the application output data is sent, at the sending step, as a plurality of data packets structured and arranged according to HTTP 1.1.

4. A computer system comprising:
   a first computer network;
   a first computer subsystem comprising collaborative application software, with the collaborative application software comprising machi readable instructions for sending application output data over the computer network;
   a second computer subsystem structured to receive the application output data; and
   a second subsystem firewall, located in front of the second application subsystem, the second-subsystem firewall structured to communicate the application output data to the second computer subsystem through a hypertext transfer protocol keep-alive connection that is kept open for the duration of a collaboration,
   wherein the computer system further comprises communication software comprising machine readable instructions for opening a first subsystem thread in the second computer subsystem for receiving the application output data, and
   wherein the second computer subsystem comprises a second subsystem socket structured to receive the application output data; and
   the communication software further comprises machine readable instructions for causing the second-subsystem socket to block on a read.

5. The system of claim 4 wherein the communication software further comprises instructions causing the first-subsystem thread to sleep.

6. The system of claim 4 wherein the collaborative application software sends the application output data as a stateful communication.

7. The system of claim 6, wherein the application output data is structured and arranged according to an HTTP 1.1 protocol.

8. The system of claim 7 wherein:
   the second-subsystem firewall comprises a port 80; and
   the application output data is communicated across the second-subsystem firewall through a connection originated through port 80.

9. The system of claim 4 wherein the first computer subsystem comprises:
   a server computer;
   a Web server computer, and a second computer network structured to allow data communication between the server computer and the Web server computer.

10. The system of claim 9 wherein:

the server computer comprises at least a portion of the collaborative applications software; and the Web server computer is structured to receive the application output data from the server computer over the second computer network and to send the application output data to the second computer subsystem over the first computer network.

11. The system of claim 4, further comprising:

a third computer subsystem structured to receive the application output data; and a third-subsystem firewall, located in front of the third computer subsystem the third-subsystem firewall structured to communicate the application output data to the third computer subsystem through a hypertext transfer protocol keep-alive connection.

12. The system of claim 11 wherein the collaborative application software comprises at least one of the following functions: a word processor, a task scheduling tool, a graphics program, a presentation program, a spreadsheet, a game, a music studio.

13. A computer system comprising:

a first computer network;

a first computer subsystem comprising collaborative application software, with the collaborative application software comprising machine readable instructions for sending application output data over the computer network;

a second computer subsystem structured to receive the application output data;

a second-subsystem firewall, located in front of the second application subsystem, the second-subsystem firewall structured to communicate the application output data to the second computer subsystem through a hypertext transfer protocol keep-alive connection that is kept open for the duration of a collaboration;

a third computer subsystem structured to receive the application output data; and a third-subsystem firewall, located in front of the third computer subsystem the third-subsystem firewall structured to communicate the application output data to the third computer subsystem through a hypertext transfer protocol keep-alive connection, wherein communication between the first computer subsystem, the second computer subsystem and the third computer subsystem is in real-time.

14. A computer system comprising:

a first computer network;

a first computer subsystem comprising collaborative application software, with the collaborative application software comprising machine readable instructions for sending application output data over the computer network;

a second computer subsystem structured to receive the application output data;

a second-subsystem firewall located in front of the second application subsystem, the second-subsystem firewall structured to communicate the application output data to the second computer subsystem through a hypertext transfer protocol keep-alive connection that is kept open for the duration of a collaboration;

a third computer subsystem structured to receive the application output data; and a third-subsystem firewall, located in front of the third computer subsystem the third-subsystem firewall structured to communicate the application output data to the third computer subsystem through a hypertext transfer protocol keep-alive connection, wherein the third computer subsystem comprises a third-subsystem socket structured to receive the application output data; and the communication software further comprises machine readable instructions for causing the third-subsystem socket to block on a read.

15. A computer system comprising:

a first computer network;

a first computer subsystem comprising collaborative application software, with the collaborative application software comprising machine readable instructions for sending application output data over the computer network;

a second computer subsystem structured to receive the application output data; and a second-subsystem firewall, located in front of the second application subsystem, the second-subsystem firewall structured to communicate the application output data to the second computer subsystem through a hypertext transfer protocol keep-alive connection that is kept open for the duration of a collaboration, wherein the first computer subsystem comprises a server computer; a Web server computer, and a second computer network structured to allow data communication between the server computer and the Web server computer;

wherein the server computer comprises at least a portion of the collaborative applications software; and wherein the Web server computer is structured to receive the application output data from the server computer over the second computer network and to send the application output data to the second computer subsystem over the first computer network; and wherein the Web server computer comprises a Web server socket structured to receive the application output data from the server computer over the second computer network; and the communication software further comprises machine readable instructions for causing the Web server socket to block on a read.

* * * * *